US011976831B2

(12) United States Patent
Kawano et al.

(10) Patent No.: US 11,976,831 B2
(45) Date of Patent: May 7, 2024

(54) AIR-CONDITIONER, AIR-CONDITIONING SYSTEM, AND METHOD FOR MONITORING AIR-CONDITIONER (71) Applicants: DAIKIN INDUSTRIES, LTD., Osaka (JP); DAIKIN EUROPE N.V., Ostend (BE)

(72) Inventors: Satoshi Kawano, Osaka (JP); Kyouji Araya, Plzen (CZ); Kazuya Fukuda, Ostend (BE); Ryuuichi Toyota, Osaka (JP); Kazunari Fukagawa, Osaka (JP); Makoto Inoue, Osaka (JP); Natsuko Kitagawa, Osaka (JP)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 0 days.

(21) Appl. No.: 17/790,295

(22) PCT Filed: Jan. 4, 2021

(86) PCT No.: PCT/JP2021/000039
§ 371 (c)(1),
(2) Date: Jun. 30, 2022

(87) PCT Pub. No.: WO2021/176826
PCT Pub. Date: Sep. 10, 2021

(65) Prior Publication Data
US 2023/0107694 A1    Apr. 6, 2023

(30) Foreign Application Priority Data
Mar. 6, 2020 (EP) .................................... 20161360

(51) Int. Cl.
*F24F 11/36* (2018.01)
*F24F 11/64* (2018.01)
(Continued)

(52) U.S. Cl.
CPC .............. *F24F 11/36* (2018.01); *F24F 11/64* (2018.01); *F24F 11/65* (2018.01); *F24F 11/755* (2018.01); *F24F 11/89* (2018.01); *F24F 2110/65* (2018.01)

(58) Field of Classification Search
CPC .. F24F 11/36; F24F 11/64; F24F 11/65; F24F 11/755; F24F 11/89; F24F 2110/65
See application file for complete search history.

(56) References Cited

U.S. PATENT DOCUMENTS

2016/0178229 A1* 6/2016 Chen ........................ F24F 11/30
62/126
2017/0370605 A1* 12/2017 Makino .................... F24F 11/36
(Continued)

FOREIGN PATENT DOCUMENTS

EP    3 279 590 A1    2/2018
EP    3 396 261 A1    10/2018
(Continued)

OTHER PUBLICATIONS

International Preliminary Report on Patentability and Written Opinion of the International Searching Authority for International Application No. PCT/JP2021/000039, dated Sep. 15, 2022.
(Continued)

*Primary Examiner* — Nelson J Nieves
(74) *Attorney, Agent, or Firm* — Birch, Stewart, Kolasch & Birch, LLP (57) ABSTRACT

A method monitors an air-conditioner having a semi-conductor gas sensor, the method including: determining that a refrigerant leakage has occurred on condition that the detection value is equal to or greater than a first threshold when the fan is in operation; starting operation of the fan as a provisional operation if the detection value is equal to or greater than a second threshold when the fan is not in operation; stopping the provisional operation of the fan;
(Continued)

determining that a refrigerant leakage has occurred on condition that the detection value is equal to or greater than a third threshold after stopping the provisional operation of the fan; and taking a predetermined action for outputting alarm information and/or limiting supply of refrigerant to the heat exchanger when a refrigerant leakage is determined to have occurred.

20 Claims, 3 Drawing Sheets

(51) Int. Cl.
*F24F 11/65* (2018.01)
*F24F 11/755* (2018.01)
*F24F 11/89* (2018.01)
*F24F 110/65* (2018.01)

(56) References Cited

U.S. PATENT DOCUMENTS

| | | | | |
|---|---|---|---|---|
| 2018/0094844 | A1* | 4/2018 | Suzuki | F25B 13/00 |
| 2018/0106516 | A1* | 4/2018 | Tanaka | F24F 11/49 |
| 2018/0299169 | A1* | 10/2018 | Suzuki | F25B 49/02 |
| 2019/0086111 | A1* | 3/2019 | Yamamoto | F25B 1/00 |
| 2019/0170383 | A1 | 6/2019 | Weinert | |
| 2019/0338971 | A1 | 11/2019 | Yoneyama et al. | |
| 2019/0390873 | A1* | 12/2019 | Suzuki | F25B 1/00 |
| 2020/0056820 | A1* | 2/2020 | Suzuki | F25B 49/005 |
| 2021/0293430 | A1* | 9/2021 | Yamada | F24F 11/86 |

FOREIGN PATENT DOCUMENTS

| | | |
|---|---|---|
| EP | 3 460 380 A1 | 3/2019 |
| EP | 3 572 744 A1 | 11/2019 |

OTHER PUBLICATIONS

Extended European Search Report, issued in Priority Application No. 20161360.1, dated Sep. 15, 2020.
International Search Report, issued in PCT/JP2021/000039, dated Mar. 31, 2021.
Written Opinion of the International Searching Authority, issued in PCT/JP2021/000039, dated Mar. 31, 2021.

\* cited by examiner

AIR-CONDITIONER, AIR-CONDITIONING SYSTEM, AND METHOD FOR MONITORING AIR-CONDITIONER

TECHNICAL FIELD

The present invention relates to an air-conditioner, an air-conditioning system, and a method for monitoring an air-conditioner.

BACKGROUND ART

Patent Literature 1 (EP 3 396 261 A1) proposes an air-conditioner configured to detect occurrence of a refrigerant leakage in the air-conditioner by using a semi-conductor gas sensor. The air-conditioner is configured to take actions such as outputting alarm information when occurrence of a refrigerant leakage has been detected. It is important to take necessary safety measures when a refrigerant leakage has occurred in an air-conditioner, especially when flammable or slightly flammable refrigerant is used. The semi-conductor gas sensors are easily and cheaply available in general. Thus, it is possible to enhance the safety of the air-conditioner at a low cost.

Meanwhile, the semi-conductor gas sensors are reactive to not only a target substance such as refrigerant but also other substances such as hydrocarbons (hereinafter referred to as "non-target substances"). For instance, when a gas and/or particles of a chemical substance (hereinafter referred to as "chemical substances") exist in a space which is air-conditioned by the air-conditioner and/or in which the air-conditioner is disposed (herein after referred to as a "target space"), the semi-conductor gas sensor could sense the chemical substances and output a high detection value. As a result, it would be erroneously determined that a refrigerant leakage has occurred. Such false detections result in a lot of unnecessary actions being taken.

In this regard, Patent Literature 1 (EP 3 396 261 A1) further proposes using a porous material as a fine particle adsorption filter configured to adsorb non-target substances. The porous material is disposed so as to cover an air inlet of the air-conditioner. Thereby, it is possible to reduce influences of the non-target substances to the refrigerant leakage detection.

However, when unforeseen non-target substances exist, the porous material would not necessarily function properly. Thus, the false detections cannot be effectively reduced. Meanwhile, if a threshold of the detection value that is used for the leakage determination is raised in order to avoid such false detections, actual refrigerant leakage would fail to be detected. Such detection omissions result in necessary safety measures being not taken. Moreover, covering the air inlet by the porous material causes an increase in suction resistance of an air. This would deteriorate air-conditioning performance of the air-conditioner.

CITATION LIST

Patent Literature

[PTL 1] EP 3 396 261 A1

SUMMARY OF INVENTION

The object of the present invention is to improve usability and safety of an air-conditioner and an air-conditioning system without deteriorating air-conditioning performance thereof.

A first aspect of the present invention provides an air-conditioner comprising: an air channel; a fan configured to cause an airflow passing through the air channel; a heat exchanger disposed in the air channel to cause a heat-exchange between refrigerant flowing therein and air passing therethrough; refrigerant pipes for supplying refrigerant to the heat exchanger and discharging the refrigerant from the heat exchanger; a semi-conductor gas sensor disposed in the air channel and reactive to at least predetermined refrigerant to output a detection value indicating a level of intensity of reaction of the semi-conductor gas sensor; a first determination section configured to determine that a refrigerant leakage has occurred on condition that the detection value is equal to or greater than a first threshold when the fan is in operation; a second determination section configured to, if the detection value is equal to or greater than a second threshold when the fan is not in operation, start operation of the fan as a provisional operation, stop the provisional operation of the fan, and determine that a refrigerant leakage has occurred on condition that the detection value is equal to or greater than a third threshold after stopping the provisional operation of the fan, the second threshold being the same as or different from the first threshold, the third threshold being the same as or different from each of the first threshold and the second threshold; and a detection result utilization section configured to take a predetermined action for outputting alarm information and/or limiting supply of refrigerant to the heat exchanger when a refrigerant leakage is determined to have occurred by any one of the first and second determination sections.

With the above configuration, a refrigerant leakage detection is performed by using the semi-conductor gas sensor disposed in the air channel. The air channel may include any space in the air-conditioner in which an airflow occurs due to the operation of the fan. When the detection value outputted from the sensor is high during operation of the fan, the predetermined action as a safety measure is swiftly taken. On the other hand, when the detection value outputted from the sensor is high while the fan is not operating, operation of the fan is firstly performed as a provisional operation. Then, if the detection value is still high or has become high even after the provisional operation of the fan, the predetermined action is taken. Here, it can be said that the provisional operation is an operation which is executed for a certain amount of time independently of an air-conditioning operation of the air-conditioner.

Leakages of refrigerant in air-conditioners tend to occur at the heat exchanger or in the vicinity thereof, and tend to continue for a certain period of time. Hence, when a refrigerant leakage has occurred, density of refrigerant in the air is less likely to decrease even if the air around the sensor (hereinafter referred to as "the sensor atmosphere") is stirred or ventilated by the operation of the fan. Moreover, even if density of refrigerant in the sensor atmosphere has decreased, it promptly begins to increase after the operation of the fan has been stopped.

On the other hand, generation of chemical substances in a target space does not continue that long. Even if it continues, generation site of the chemical substances is distanced from the sensor compared with refrigerant leakage site. Thus, the chemical substances as non-target substances that reached the sensor atmosphere are easily diluted by operation of the fan, and density of the chemical substances in the sensor atmosphere is not likely to become high during the fan is in operation. It also takes long time until the density of the chemical substances in the sensor atmosphere increases again after the fan has been stopped.

Thus, with the air-conditioner according to the first aspect, it is possible to detect an occurrence of a refrigerant leakage in the air-conditioner while avoiding both false detections and detection omissions as much as possible, and thus take necessary safety measures as soon as possible but only when necessary. Moreover, any porous material for adsorbing non-target substances as proposed by Patent Literature 1 (EP 3 396 261 A1) is not required. Accordingly, it is possible to provide an air-conditioner with high usability and high safety without deteriorating air-conditioning performance thereof.

According to a preferred embodiment of the air-conditioner mentioned above, the air-conditioner further comprises an expansion mechanism disposed in one of the refrigerant pipes, wherein the expansion mechanism and at least parts of the refrigerant pipes that are connected with the heat exchange are disposed in the air channel.

With the above configuration, a refrigerant leakage from the expansion mechanism and parts of the refrigerant pipes connecting with the heat exchanger and the expansion mechanism can be detected by the semi-conductor gas sensor disposed in the air channel. Not only the heat exchanger but also the expansion mechanism and the above parts are relatively likely to become a refrigerant leakage point. Thus, it is possible to further improve the safety of the air-conditioner.

According to another preferred embodiment of any one of the air-conditioners mentioned above, the heat exchanger and the refrigerant pipes form part of a heat-pump circuit including a refrigerant compressor, and the predetermined action includes outputting a signal for stopping an operation of the refrigerant compressor.

With the above configuration, the operation of the refrigerant compressor can be stopped when a refrigerant leakage has occurred, so as to stop further supply of refrigerant to the air-conditioner. Thus, it is possible to further improve the safety of the air-conditioner.

According to further another preferred embodiment of any one of the air-conditioners mentioned above, the refrigerant pipes are part of a liquid refrigerant pipe and a gas refrigerant pipe in which a liquid-side shut-off valve and a gas-side shut-off valve are disposed, respectively, and the predetermined action includes outputting a signal for closing the liquid-side shut-off valve and the gas-side shut-off valve.

With the above configuration, connection of the air-conditioner to a refrigerant compressor can be shut of when a refrigerant leakage has occurred, so as to stop further supply of refrigerant to the air-conditioner. Thus, it is possible to further improve the safety of the air-conditioner.

According to further another preferred embodiment of any one of the air-conditioners mentioned above, the heat exchanger and the refrigerant pipes form part of a heat-pump circuit including a refrigerant compressor, and the predetermined action includes outputting a signal for performing steps of closing the liquid-side shut-off valve, operating the refrigerant compressor until a predetermined condition is satisfied, and closing the gas-side shut-off valve in this order.

With the above configuration, the refrigerant in the air-conditioner can be retrieved by a pump-down operation when a refrigerant leakage has occurred, so as to avoid further leakage of refrigerant from the air-conditioner. Thus, it is possible to further improve the safety of the air-conditioner.

According to further another preferred embodiment of any one of the air-conditioners mentioned above, the predetermined action includes, when the air channel is in communication with a space installed with an air blower which is configured to discharge an air in the space, outputting a signal for starting operation of the air blower after the supply of refrigerant to the heat exchanger has been limited.

With the above configuration, the target space of the air-conditioner can be ventilated when a refrigerant leakage has occurred so as to dilute or discharge the leaked refrigerant existing in the target space. Thus, it is possible to further improve the safety of the air-conditioner.

According to further another preferred embodiment of any one of the air-conditioners mentioned above, the semi-conductor gas sensor is disposed on a downstream side of the airflow with respect to the heat exchanger.

With the above configuration, when a refrigerant leakage has occurred at the heat exchanger or in the vicinity thereof, the leaked refrigerant can flow towards the sensor atmosphere, and thus detected by the semi-conductor gas sensor more reliably. Thus, it is possible to further improve the safety of the air-conditioner.

According to further another preferred embodiment of any one of the air-conditioners mentioned above, the predetermined refrigerant is R32 refrigerant, and the semiconductor gas sensor is disposed on an inner bottom surface of the air channel.

With the above configuration, when a refrigerant leakage has occurred at the heat exchanger or in the vicinity thereof, the leaked refrigerant can flow down towards the sensor atmosphere since R32 refrigerant is heavier than air. R32 refrigerant has characteristics of the zero ozone depletion potential and the low global warming potential. Thus, it is possible to achieve an eco-friendly air-conditioner while ensuring high safety.

According to further another preferred embodiment of any one of the air-conditioners mentioned above, the air-conditioner further comprises: an information acquisition section configured to acquire detection environment information relating to an environment surrounding the semi-conductor gas sensor, wherein the first determination section further configured to change value of the first threshold based on the acquired detection environment information.

Density of leaked refrigerant in the sensor atmosphere would vary depending on an environment surrounding the semi-conductor gas sensor. For instance, if the volume of the air flow by the fan is high, the density of leaked refrigerant tends to be low. If the humidity of the sensor atmosphere is low, the semi-conductor gas sensor tends to be more reactive to the non-target substances. Thus, with the above configuration, it is possible to improve accuracy of a refrigerant leakage detection to enhance safety and usability of the air-conditioner.

According to further another preferred embodiment of any one of the air-conditioners mentioned above, the second determination section is further configured to stop the provisional operation of the fan when a first time length has elapsed after starting the provisional operation of the fan, repeatedly determine whether the detection value is equal to or greater than the third threshold after stopping the provisional operation of the fan, and determine that a refrigerant leakage has occurred when the detection value has been determined as equal to or greater than the third threshold by the time when a second time length has elapsed after stopping the provisional operation of the fan, the second time length being the same as or different from the first time length.

If the time period of the provisional operation of the fan is too short, density of the non-target substances in the sensor atmosphere would not decrease to a level low enough to be distinguished from a refrigerant leakage. Meanwhile, if the above time period is too long, it would take unnecessarily long time to determine that a refrigerant leakage has occurred. Moreover, if the elapsed time between the provisional operation and a determination of whether a refrigerant leakage has occurred (hereinafter referred to as a "refrigerant leakage determination") is too short, density of the leaked refrigerant in the sensor atmosphere would not increase to a level high enough to be distinguished from existence of non-target substances. Meanwhile, if the above elapsed time is too long, it would take unnecessarily long time to determine that a refrigerant leakage has occurred.

In this regard, with the above configuration, it is possible to improve accuracy of a refrigerant leakage detection to enhance safety and usability of the air-conditioner. The first and second time lengths appropriate for detecting an occurrence of a refrigerant leakage with high accuracy may be determined based on experiments in advance.

According to further another preferred embodiment of any one of the air-conditioners mentioned above in which the second determination section is configured to determine that a refrigerant leakage has occurred when the detection value has been determined as equal to or greater than the third threshold by the time when the second time length has elapsed after stopping the provisional operation of the fan, the second determination section is further configured to repeat, up to a predetermined number of times, the provisional operation and the determination of whether the detection value is equal to or greater than the third threshold, as long as the detection value has been determined as equal to or greater than the third threshold within the second time length after the latest provisional operation, and determine that a refrigerant leakage has occurred on condition that the detection value has been determined equal to or greater than the third threshold within the second time length after each of the predetermined number of times of the provisional operations in a row.

With the above configuration, in a case where the refrigerant leakage determination is performed by executing the provisional operation of the fan, a determination that a refrigerant leakage has occurred is not to be made unless a determination that the detection value is equal to or greater than the third threshold has been made after each of the predetermined number of times of the provisional operations in a row. Density of the non-target substances in the sensor atmosphere would become temporality high for some reasons even after the provisional operation of the fan. Thus, such cases can be prevented from leading to false detections. Consequently, it is possible to improve accuracy of a refrigerant leakage detection to enhance safety and usability of the air-conditioner.

According to further another preferred embodiment of any one of the air-conditioners mentioned above in which the second determination section is configured to determine that a refrigerant leakage has occurred when the detection value has been determined as equal to or greater than the third threshold by the time when the second time length has elapsed after stopping the provisional operation of the fan, the semi-conductor gas sensor is configured to output the detection value continuously or repeatedly, the first determination section is configured to compare the detection value with the first threshold continuously or repeatedly during the fan is in operation except when the fan is in the provisional operation, and the second determination section is configured to compare the detection value with the second threshold continuously or repeatedly during the fan is not in operation except after the provisional operation of the fan, and compare the detection value and the third threshold continuously or repeatedly to determine whether a refrigerant leakage has occurred during the fan is not in operation after the provisional operation of the fan.

With the above configuration, the comparison of the detection value of the sensor with the thresholds is performed continuously or repeatedly to determine whether a refrigerant leakage has occurred. Thus, it is possible to detect an occurrence of a refrigerant leakage immediately after a refrigerant leakage has occurred.

A second aspect of the present invention provides an air-conditioning system comprising: a utilization-side unit which is the air-conditioner according to any one of the air-conditioners mentioned above; a heatsource-side unit configured to supply cool heat and/or hot heat to the utilization-side unit by means of refrigerant; and a system controller configured to control operation of the heatsource-side unit, wherein the system controller is further configured to continue the operation of the heatsource-side unit during the provisional operation of the fan.

With the above configuration, at least for the same reason as the first aspect of the present invention, it is possible to provide an air-conditioning system with high usability and high safety without deteriorating air-conditioning performance thereof. Moreover, since the heatsource-side unit can continue its operation even when the fan is in the provisional operation. Hence, it is possible to prevent the heatsource-side unit from stopping unnecessarily by false detections.

A third aspect of the present invention provides a method for monitoring an air-conditioner, the air-conditioner comprising an air channel, a fan configured to cause an airflow passing through the air channel, a heat exchanger disposed in the air channel to cause a heat-exchange between refrigerant flowing therein and air passing therethrough, refrigerant pipes for supplying refrigerant to the heat exchanger and discharging the refrigerant from the heat exchanger, and a semi-conductor gas sensor disposed in the air channel and reactive to at least predetermined refrigerant to output a detection value indicating a level of intensity of reaction of the semi-conductor gas sensor, the method comprising: determining that a refrigerant leakage has occurred on condition that the detection value is equal to or greater than a first threshold when the fan is in operation; starting operation of the fan as a provisional operation if the detection value is equal to or greater than a second threshold when the fan is not in operation, the second threshold being the same as or different from the first threshold; stopping the provisional operation of the fan; determining that a refrigerant leakage has occurred on condition that the detection value is equal to or greater than a third threshold after stopping the provisional operation of the fan, the third threshold being the same as or different from each of the first threshold and the second threshold; and taking a predetermined action for outputting alarm information and/or limiting supply of refrigerant to the heat exchanger when a refrigerant leakage is determined to have occurred.

With the above processes, at least for the same reason as the first aspect of the present invention, it is possible to improve usability and high safety of the air-conditioner without deteriorating air-conditioning performance thereof.

DESCRIPTION OF EMBODIMENTS

Detailed Description of Preferred Embodiment

A preferred embodiment of an air-conditioning system according to the present invention (hereafter referred to as a "present embodiment") will be described with reference to the drawings.

<Configuration of System>

Figure 1:
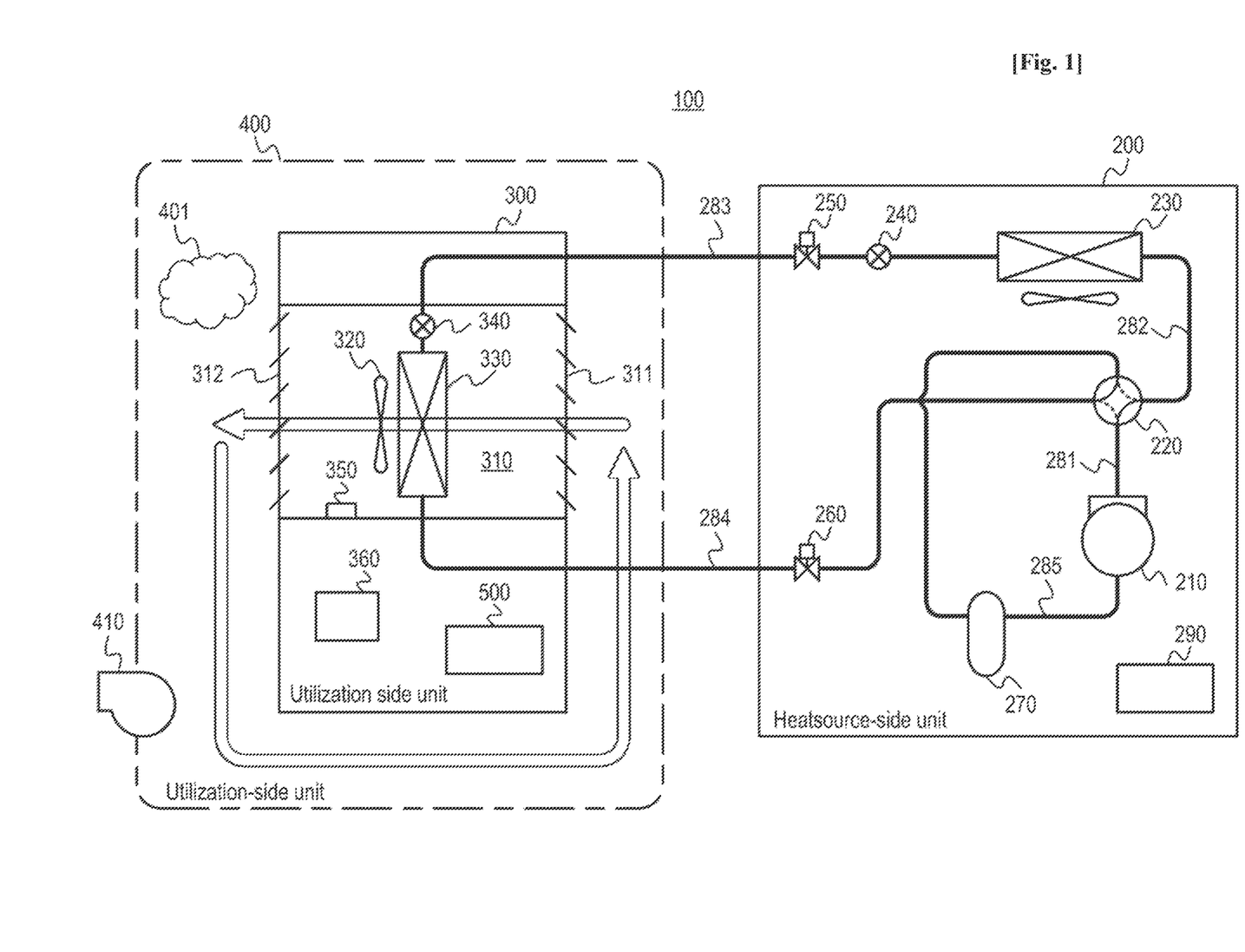
FIG. 1 is a schematic configuration diagram of an air-conditioning system according to an embodiment of the present invention.

FIG. 1 is a schematic configuration diagram of an air-conditioning system according to the present embodiment.

As shown in FIG. 1, an air-conditioning system 100 according to the present embodiment comprises a heat-source-side unit 200 and a utilization-side unit 300 forming a heat-pump circuit. The utilization-side unit 300 corresponds to an air-conditioner according to the present invention. For instance, the utilization-side unit 300 is placed in a target space 400, and the heatsource-side unit 200 is disposed outside the target space 400. The heatsource-side unit 200 and utilization-side unit 300 may be produced separately and then connected to each other via later-mentioned pipes. Alternatively, the heatsource-side unit 200 and the utilization-side unit 300 may be produced as an integrated single unit.

<Configuration of Heatsource-Side Unit>

The heatsource-side unit 200 includes a refrigerant compressor 210, a mode switching mechanism 220, a heat-source side HEX (heat exchanger) 230, a heatsourceside expansion mechanism 240, a liquid-side shut-off valve 250, a gas-side shut-off valve 260, and an accumulator 270. A discharge port of the refrigerant compressor 210 and the mode switching mechanism 220 are connected by a high-pressure refrigerant pipe 281. The mode switching mechanism 220 and the heat-source side HEX 230 are connected by a first gas refrigerant pipe 282. The heat-source side HEX 230 and the utilization-side unit 300 are connected by a liquid refrigerant pipe 283. The utilization-side unit 300 and the mode switching mechanism 220 are connected by a second gas refrigerant pipe 284. The mode switching mechanism 220 and a suction port of the refrigerant compressor 210 are connected by a low-pressure refrigerant pipe 285.

The heatsource-side expansion mechanism 240 is disposed in the liquid refrigerant pipe 283. The liquid-side shut-off valve 250 is disposed in a farthermost part of the liquid refrigerant pipe 283 from the refrigerant compressor 210 within the heatsource-side unit 200. The gas-side shut-off valve 260 is disposed in a farthermost part of the second gas refrigerant pipe 284 from the refrigerant compressor 210 within the heatsource-side unit 200. The accumulator 270 is disposed in the low-pressure refrigerant pipe 285.

The refrigerant compressor 210 is configured to suction refrigerant from the low-pressure refrigerant pipe 285 via the suction port, compress the suctioned refrigerant, and discharge the compressed refrigerant to the high-pressure refrigerant pipe 281 from the discharge port.

The mode switching mechanism 220 is configured to switch the state of the air-conditioning system 100 between a cooling operation mode and a heating operation mode. In the cooling operation mode, the first gas refrigerant pipe 282 is connected with the high-pressure refrigerant pipe 281, and the low-pressure refrigerant pipe 285 is connected with the second gas refrigerant pipe 284. In the heating operation mode, the high-pressure refrigerant pipe 281 is connected with the second gas refrigerant pipe 284, and the low-pressure refrigerant pipe 285 is connected with the first gas refrigerant pipe 282. The mode switching mechanism 220 may be a four-way selector valve, or a combination of branching pipes and selector valves.

The heat-source side HEX 230 is configured to cause a heat-exchange between refrigerant flowing therein and fluid passing therethrough. The fluid may be air, water, or another refrigerant. The heat-source side HEX 230 may be provided with a fan or a pump to facilitate the flow of the fluid.

The heatsource-side expansion mechanism 240 is configured to decompress and expand refrigerant flowing in the liquid refrigerant pipe when the refrigerant flows towards the heat-source side HEX 230, i.e. during the heating operation. The heatsource-side expansion mechanism 240 may be an electric expansion valve. The liquid-side shut-off valve 250 is capable of stopping refrigerant flowing out from the heatsource-side unit 200 via the liquid refrigerant pipe 283. The gas-side shut-off valve 260 is capable of stopping refrigerant flowing out from the heatsource-side unit 200 via the second gas refrigerant pipe 284. The liquid-side shut-off valve 250 and the gas-side shut-off valve 260 may be electric expansion valves. The accumulator 270 is configured to accumulate excess refrigerant in the heat-pump circuit, and also configured to separate gas refrigerant from the refrigerant flown into the accumulator 270 and forward the separated gas refrigerant to the refrigerant compressor 210.

The heatsource-side unit 200 further includes a system controller 290. The system controller 290 is configured to control operation of the heatsource-side unit 200 via wired/wireless communication paths (not shown) between the system controller 290 and the machineries in the heatsource-side unit 200. In particular, the system controller 290 is configured to receive signals transmitted from the utilization-side unit 300 including a later-mentioned pump-down signal via a wired/wireless communication path (not shown). When a pump-down signal has been received, the system controller 290 is configured to perform a pump-down operation. In the pump-down operation, the following steps are performed: closing the liquid-side shut-off valve 250; operating the refrigerant compressor 210 until a predetermined condition is satisfied, e.g. until some parameters indicate an end of pump-down; and closing the gas-side shut-off valve 260. Thereby, the refrigerant in the utilization-side unit 300 can be retrieved to the heatsource-side unit 200 side.

The system controller 290 includes an arithmetic circuit such as a CPU (Central Processing Unit), a work memory used by the CPU such as a RAM (Random Access Memory), and a recording medium storing control programs and information used by the CPU such as a ROM (Read Only Memory), although they are not shown. The system controller 290 is configured to perform information processing and signal processing by the CPU executing the control programs to control the operation of the heatsource-side unit 200.

According to the heatsource-side unit 200 with the above configuration, it is possible to supply cool heat and hot heat to the utilization-side unit 300 in a switching manner by circulating refrigerant, and also limit or stop the heat supply to the utilization-side unit 300 based on the signals from the utilization-side unit 300.

<Configuration of Utilization-Side Unit>

The utilization-side unit 300 includes an air channel 310, a fan 320, a heat exchanger (HEX) 330, an expansion mechanism 340, a semi-conductor gas sensor 350, an information output device 360, and a controller 500. The HEX 330 is connected with each of the liquid refrigerant pipe 283 and the second gas refrigerant pipe 284 extending from the heatsource-side unit 200. In other words, the HEX 330 is connected to the refrigerant compressor 210 of the heatsource-side unit 200 via the refrigerant pipes 283, 284. The expansion mechanism 340 is disposed in the liquid refrigerant pipe 283. The HEX 330 and the semi-conductor gas sensor 350 are disposed in the air channel 310. Preferably, the expansion mechanism 340 and parts of the refrigerant pipes 283, 284 that are connected with the HEX 330 are also disposed in the air channel 310.

The air channel 310 has an air inlet 311 and air outlet 312 which are open to or in connection with the target space 400. The air channel 310 is configured to allow an air to flow from the air inlet 311 towards the air outlet 312 through the HEX 330.

The fan 320 is configured to cause an airflow passing through the air channel 310 from the air inlet 311 to the air outlet 312. The fan 320 is disposed on the air outlet 312 side with respect to the HEX 330, for instance.

The HEX 330 is configured to cause a heat-exchange between refrigerant flowing therein and air passing therethrough. For instance, the HEX 330 has two headers connected with the liquid refrigerant pipe 283 and the second gas refrigerant pipe 284, respectively, a plurality of tubes each connecting the two headers, and fins outwardly extending from the tubes (not shown). The HEX 330 is configured so as to take in refrigerant from the liquid refrigerant pipe 283 and discharge the refrigerant to the second gas refrigerant pipe 284 during the cooling operation, and take in refrigerant from the second gas refrigerant pipe 284 and discharge the refrigerant to the liquid refrigerant pipe 283 during the heating operation.

The expansion mechanism 340 is configured to decompress and expand refrigerant flowing in the liquid refrigerant pipe when the refrigerant flows towards the HEX 330, i.e. during the cooling operation. The expansion mechanism 340 may be an electric expansion valve.

The semi-conductor gas sensor 350 is reactive to at least predetermined refrigerant, and configured to output a detection value indicating a level of intensity of reaction of the semi-conductor gas sensor 350 by means of a communication signal. The semiconductor gas sensor 350 may output the detection value (hereinafter referred to as "the sensor detection value Vs") continuously or regularly, and/or upon request by the controller 500. The predetermined refrigerant is refrigerant which flows in the HEX, e.g. R32 refrigerant. When refrigerant is heavier than air, like R32 refrigerant, the semi-conductor gas sensor 350 is preferably disposed on an inner bottom surface of the air channel 310. The inner bottom surface may have a depressed portion in which the semi-conductor gas sensor 350 is disposed. In addition, the semi-conductor gas sensor 350 is preferably disposed on a downstream side of the airflow with respect to the HEX 330, i.e. on the air outlet 312 side with respect to the HEX 330.

The information output device 360 is configured to receive signals from the controller 500 including a later-mentioned alarm signal via a wired/wireless communication path (not shown). The information output device 360 is configured to output alarm information by means of a sound, a light, and/or a visual image indicating an occurrence of a refrigerant leakage in the utilization-side unit 300 when an alarm signal has been received. The information output device 360 may be a loudspeaker, an electric light, and/or a display device.

The controller 500 is configured to control operation of the utilization-side unit 300 via wired/wireless communication paths (not shown) between the controller 500 and the machineries in the utilization-side unit 300. In particular, the controller 500 is configured to determine whether a refrigerant leakage has occurred in the utilizationside unit 300 based on the sensor detection value Vs. When a refrigerant leakage is determined to have occurred, the controller 500 is configured to transmit an alarm signal to the information output device 360, and transmit a pump-down signal to the system controller 290 of the heatsource-side unit 200. If an air blower 410 configured to discharge an air in the target space 400 is installed as shown in FIG. 1, the controller 500 may further output a ventilation signal for starting operation of the air blower 410 as detailed later.

The controller 500 includes an arithmetic circuit such as a CPU, a work memory used by the CPU such as a RAM, and a recording medium storing control programs and information used by the CPU such as a ROM, although they are not shown. The controller 500 is configured to perform information processing and signal processing by the CPU executing the control programs to control the operation of the utilization-side unit 300. Details of the controller 500 will be explained later.

According to the utilization-side unit 300 with the above configuration, it is possible to utilize cool or hot heat supplied from the heatsource-side unit 200 by means of refrigerant to air-condition the target space 400. Moreover, when a refrigerant leakage has occurred at the HEX 330 or in the vicinity thereof, it is possible to detect the refrigerant leakage and take necessary safety measures.

Meanwhile, when chemical substances 401 exist in the target space 400 as shown in FIG. 1, the chemical substances 401 would be adverted to the sensor atmosphere of the semi-conductor gas sensor 350, and the semi-conductor gas sensor 350 would output a high detection value even when no refrigerant leakage has occurred. In this regard, the controller 500 of the utilization-side unit 300 is configured to perform a refrigerant leakage determination such that false detections and detection omissions are avoided as much as possible as explained hereinafter.

<Functional Configuration of Controller>

Figure 2:
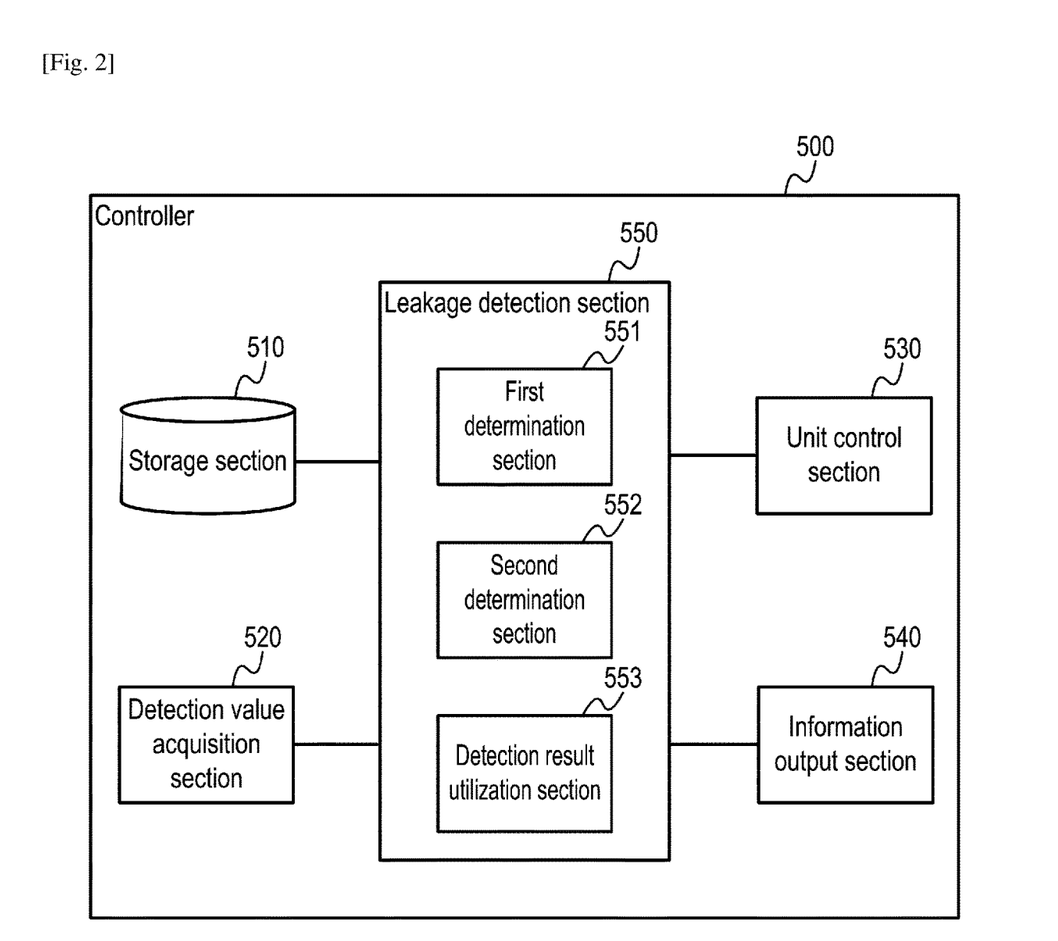
FIG. 2 is a block diagram indicating a functional configuration of a controller shown in FIG. 1.

FIG. 2 is a block diagram indicating a functional configuration of the controller 500 of the utilization-side unit 300.

As shown FIG. 2, the controller 500 includes a storage section 510, a detection value acquisition section 520, a unit control section 530, an information output section 540, and a leakage detection section 550.

A storage section 510 stores information in a form readable by the leakage detection section 550. The stored information includes a detection value threshold Vth (a first threshold Vth1, a second threshold Vth2, and a third threshold Vth3), a first time length P1, a second time length P2, and a counter threshold Cth explained later. These parameters are determined in advance by experiments or the like such that false detections and detection omissions of refrigerant leakages are avoided as much as possible. The storage section 510 may store a plurality of sets of the parameters. In this case, the controller 500 may accept a selection from the parameter sets by a user via an operation interface such as a remote controller of the utilization-side unit 300.

The detection value acquisition section 520 is configured to acquire the sensor detection value Vs which is continuously or regularly outputted from the semiconductor gas sensor 350 (see FIG. 1). The detection value acquisition section 520 may request the semi-conductor gas sensor 350 to output the sensor detection value Vs regularly. When the density of sensor-reactive substances in the sensor atmosphere varies, the sensor detection value Vs reflects this variation substantially in real-time. The detection value acquisition section 520 is configured to pass the acquired sensor detection value Vs to the leakage detection section 550.

The unit control section 530 is configured to control the operation of the utilizationside unit 300 for utilizing the cold or hot heat supplied from the heatsource-side unit 200 by controlling operations of the fan 320 and the expansion mechanism 340 (see FIG. 1). The unit control section 530 is also configured to operate the fan 320 according to instructions from the leakage detection section 550. The unit control section 530 may be further configured to inform the leakage detection section 550 whether or not the fan 320 is in operation and whether or not the fan 320 is functioning well.

The information output section 540 is configured to output signals to the information output device 360 and the system controller 290 (see FIG. 1) according to instructions from the leakage detection section 550. The information output section 540 may include a communication interface device.

The leakage detection section 550 is configured to perform the refrigerant leakage determination based on the sensor detection value Vs, and take necessary safety measures via the unit control section 530 and the information output section 540. The leakage detection section 550 includes a first determination section 551, a second determination section 552, and a detection result utilization section 553.

The first determination section 551 is configured to compare the sensor detection value Vs with the detection value threshold Vth continuously or repeatedly during the fan 320 is in operation. The first determination section 551 is configured to determine that a refrigerant leakage has occurred on condition that the sensor detection value Vs is equal to or greater than the detection value threshold Vth (a first threshold Vth1) when the fan 320 is in operation. The first determination section 551 is configured to inform that determination to the detection result utilization section 553. The first determination section 551 may be further configured to, when the fan 320 is malfunctioning, inform that to the detection result utilization section 553.

The second determination section 552 is configured to compare the sensor detection value Vs with the detection value threshold Vth (a second threshold Vth2) continuously or repeatedly during the fan 320 is not in operation. The second determination section 552 is configured to, if the sensor detection value Vs is equal to or greater than a second threshold when the fan 320 is not in operation, start operation of the fan 320 as a provisional operation, and stop the provisional operation of the fan 320. It can be said that the provisional operation is an operation which is executed for a certain amount of time independently of the normal air-conditioning operations of the utilization-side unit 300.

Then, the second determination section 552 is configured to compare the sensor detection value Vs and the detection value threshold Vth (a third threshold Vth3) again continuously or repeatedly. When the sensor detection value Vs has been determined as equal to or greater than the detection value threshold Vth by the time when the second time length P2 has elapsed after stopping the provisional operation of the fan 320, the second determination section 552 is configured to determine that a refrigerant leakage has occurred. The second determination section 552 is configured to inform that determination to the detection result utilization section 553. The second determination section 552 may be further configured to, when the fan 320 is malfunctioning, inform that to the detection result utilization section 553.

Here, the detection value threshold Vth (a second threshold) used during the fan 320 is not in operation may be the same as or different from the detection value threshold Vth (a first threshold) used during the fan 320 is in operation. The detection value threshold Vth (a third threshold) used after the provisional operation of the fan 320 may be the same as or different from each of the detection value threshold Vth (a first threshold) used during the fan 320 is in operation and the detection value threshold Vth (a second threshold) used during the fan 320 is not in operation. The second time length P2 may be the same as or different from the first time length P1.

The detection result utilization section 553 is configured to take a predetermined action for outputting alarm information and/or limiting supply of refrigerant to the HEX 330 when a refrigerant leakage is determined to have been occurred by any one of the first determination section 551 and the second determination section 552. The detection result utilization section 553 may be further configured to take the predetermined action when the fan 320 is malfunctioning.

The predetermined action includes outputting the above-mentioned pump-down signal to the system controller 290 for making the system controller 290 perform the pump-down operation. The predetermined action may include outputting a signal for stopping the operation of the refrigerant compressor 210 of the heatsource-side unit 200. The predetermined action may further include re-starting the operation of the fan 320 for diluting the leaked refrigerant, outputting the above-mentioned alarm signal to the information output device 360 for outputting the alarm information, and/or outputting a ventilation signal to the air blower 410 for starting the operation of the air blower 410.

According to the controller 500 with the above configuration, when the fan 320 is not in operation, the refrigerant leakage determination is made after performing the provisional operation of the fan 320, while the refrigerant leakage determination is made without performing the provisional operation when the fan 320 is in operation. The density of the chemical substances 401 in the sensor atmosphere is unlikely to become high when the fan 320 is operating and after the fan 320 has stopped operating. Thus, it is possible to detect a refrigerant leakage distinctively from an influence of chemical substances.

<Operation of Controller>

Figure 3:
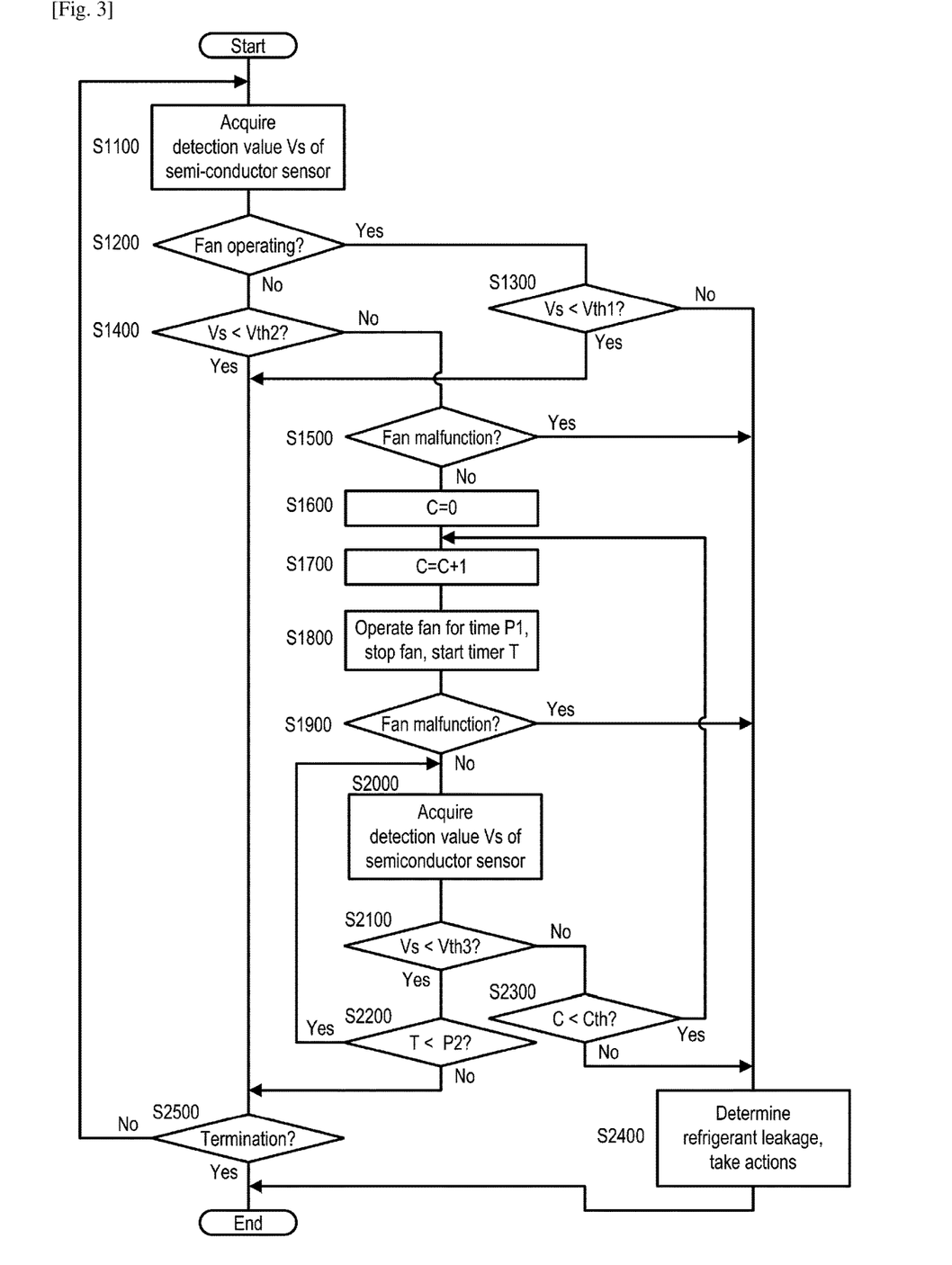
FIG. 3 is a flow chart indicating the process performed by the controller.

FIG. 3 is a flow chart indicating a process performed by the controller 500.

In step S1100, the detection value acquisition section 520 acquires the sensor detection value Vs from the semiconductor gas sensor 350. [0081] In step S1200, the first determination section 551 determines whether the fan 320 is operating. If the fan 320 is operating (S1200: Yes), the first determination section 551 proceeds to step S1300, and if not (S1200: No), proceeds to later-mentioned step S1400.

In step S1300, the first determination section 551 determines whether the sensor detection value Vs is less than a first threshold Vth1 (the detection value threshold Vth). The detection value acquisition section 520 or the first determination section 551 may obtain a moving average value of the sensor detection values Vs in a certain time length, and use the moving average value as the sensor detection value Vs to be compared with the first threshold Vth1 in step S1300. If the sensor detection value Vs is less than the first threshold Vth1 (S1300: Yes), the first determination section 551 proceeds to later-mentioned step S2500, and if not, i.e. if the sensor detection value Vs is equal to or greater than the first threshold Vth1 (S1300: No), the first determination section 551 proceeds to later-mentioned step S2400.

In step S1400, the second determination section 552 determines whether the sensor detection value Vs is less than a second threshold Vth2 (the detection value threshold Vth). The detection value acquisition section 520 or the second determination section 552 may obtain a moving average value of the sensor detection values Vs in a certain time length, and use the moving average value as the sensor detection value Vs to be compared with the second threshold Vth2 in step S1400.

If the sensor detection value Vs is less than the second threshold Vth2 (S1400: Yes), the second determination section 552 proceeds to later-mentioned step S2500, and if not, i.e. if the sensor detection value Vs is equal to or greater than the second threshold Vth2 (S1400: No), the second determination section 552 proceeds to step S1500. At the time when the sensor detection value Vs has been determined as equal to or greater than the second threshold Vth2 in step S1400, the leakage detection section 550 may also output first preliminary alarm information to the information output device 360 via the information output section 540. The first preliminary alarm information is information distinguishable from alarm information which is to be outputted in latermentioned step S2400.

In step S1500, the first determination section 551 determines whether the fan 320 is malfunctioning. If the fan 320 is malfunctioning (S1500: Yes), the first determination section 551 proceeds to later-mentioned step S2400, and if not (S1500: No), proceeds to step S1600. The determination on whether the fan 320 is malfunctioning may be performed by the detection result utilization section 553 instead of the first determination section 551.

In step S1600, the second determination section 552 sets a value "0" to a counter variable C. In step S1700, a value "1" is added to the counter variable C. In step S1800, the second determination section 552 causes the fan 320 to start its provisional operation. In other words, the second determination section 552 starts the provisional operation of the fan 320 if the sensor detection value Vs is equal to or greater than the second threshold Vth2 when the fan 320 is not in operation. Then, the second determination section 552 causes the fan 320 to stop the provisional operation when the first time length P1 has elapsed after starting the provisional operation. Thus, the second determination section 552 makes the fan 320 operate only for the first time length P1. The second determination section 552 also resets and activates a timer value T to measure an elapsed time after the provisional operation when the provisional operation has been terminated.

It should be noted that the first determination section 551 does not compare the sensor detection value Vs with the first threshold Vth1 when the fan 320 is in the provisional operation in step S1800. The system controller 290 of the heatsource-side unit 200 continues the operation of the heatsource-side unit 200 during the fan 320 is in the provisional operation in step S1800.

In step S1900, the second determination section 552 determines whether the fan 320 is malfunctioning. If the fan 320 is malfunctioning (S1900: Yes), the second determination section 552 proceeds to later-mentioned step S2400, and if not (S1900: No), proceeds to step S2000. The determination on whether the fan 320 is malfunctioning may be performed by the detection result utilization section 553 instead of the second determination section 552.

In step S2000, the detection value acquisition section 520 acquires the sensor detection value Vs from the semiconductor gas sensor 350 again. In step S2100, the second determination section 552 determines whether the sensor detection value Vs is less than a third threshold Vth3 (the detection value threshold Vth). The detection value acquisition section 520 or the second determination section 552 may obtain a moving average value of the sensor detection values Vs in a certain time length, and use the moving average value as the sensor detection value Vs to be compared with the third threshold Vth3 in step S2100.

If the sensor detection value Vs is less than the third threshold Vth3 (S2100: Yes), the second determination section 552 proceeds to step S2200, and if not, i.e. if the sensor detection value Vs is equal to or greater than the third threshold Vth3 (S2100: No), the second determination section 552 proceeds to later-mentioned step S2300. At the time when the sensor detection value Vs has been determined as equal to or greater than the third threshold Vth3 in step S2100, the leakage detection section 550 may also output second preliminary alarm information to the information output device 360 via the information output section 540. The second preliminary alarm information is information distinguishable from alarm information which is to be outputted in latermentioned step S2400 and, if the first preliminary alarm information mentioned above was outputted, preferably further distinguishable from the first preliminary alarm information.

In step S2200, the second determination section 552 determines whether the timer value T is less than the second time length P2. If the timer value T is less than the second time length P2 (S2200: Yes), the second determination section 552 proceeds back to step S2000, and if not (S2200: No), proceeds to later-mentioned step S2500. Thus, the second determination section 552 repeatedly determines whether the sensor detection value Vs is equal to or greater than the third threshold Vth3 after stopping the provisional operation of the fan 320. And, if the sensor detection value Vs has been determined as equal to or greater than the third threshold Vth3 within the second time length P2 after the latest provisional operation, the second determination section 552 proceeds to step S2300.

In step S2300, the second determination section 552 determines whether the value of the counter variable C is less than the counter threshold Cth. The counter threshold Cth is a natural number. If the value of the counter variable C is less than the counter threshold Cth (S2300: Yes), the second determination section 552 proceeds back to step S1700. Thus, the second determination section 552 repeats, up to the number of times defined by the counter threshold Cth, the provisional operation of the fan 320 and the determination of whether the sensor detection value Vs is equal to or greater than the third threshold Vth3, as long as the sensor detection value Vs has been determined as equal to or greater than the third threshold Vth3 within the second time length P2 after the latest provisional operation. If the value of the counter variable C has reached the counter threshold Cth (S2300: No), the second determination section 552 proceeds to step S2400.

In a case where the counter threshold Cth is a value "1", steps S1600, S1700 and S2300 are not required. The process proceeds directly to step S2400 when the sensor detection value Vs has been determined as equal to or greater than the third threshold value Vth3 in step S2100.

In step S2400, the first determination section 551 or the second determination section 552 determines that a refrigerant leakage has occurred. In other words, during the fan 320 is in operation, the first determination section 551 determines that a refrigerant leakage has occurred on condition that the sensor detection value Vs is equal to or greater than the first threshold Vth1. During the fan 320 is not in operation, the second determination section 552 determines that a refrigerant leakage has occurred on condition that the sensor detection value Vs has been determined as equal to or greater than the third threshold Vth3 within the second time length P2 after each of the predetermined number of times of the provisional operations in a row defined by the counter threshold Cth.

As a result, the detection result utilization section 553 takes the above-mentioned predetermined actions for outputting alarm information, limiting supply of refrigerant to the HEX 330, or the like. The detection result utilization section 553 may output the alarm information in different ways and/or with different contents depending on whether or not the fan 320 was in operation when it was determined that a refrigerant leakage has occurred.

The detection result utilization section 553 may take the predetermined actions in S2400 when the fan 320 has been found malfunctioning in step S1500 or step S1900. In this case, alarm information to be outputted is preferably distinguishable from the alarm information which is to be outputted when a refrigerant leakage is determined to have occurred.

In step S2500, the leakage detection section 550 determines whether a termination of operation has been designated. The designation may be made by a user operation, another device, or the leakage detection section 550 itself. If the termination of the operation has not been designated (S2500: No), the leakage detection section 550 proceeds back to step S1100, and if designated (S2500: Yes), terminates its operation.

By the above process, the controller 500 can properly and swiftly detect an occurrence of a refrigerant leakage in the utilization-side unit 300 whenever the refrigerant leakage has occurred. It should be noted that the execution order of abovementioned step S1500 and S1200 may be changed such that the determination regarding the sensor detection value Vs may be made after the determination regarding the state of the fan 320.

It should be noted that some of the above steps may be omitted depending on required performance and/or circumstances of the utilization-side unit 300. For instance, if malfunction of the fan 320 can be detected by other means, steps S1500 and/or S1900 may be omitted.

<Advantageous Effect>

As described above, the air-conditioning system 100 of the present embodiment is configured to perform the provisional operation of the fan 320 of the utilization-side unit 300 if the sensor detection value Vs is equal to or greater than the detection value threshold Vth when the fan 320 is not in operation, and determine that a refrigerant leakage has occurred if the sensor detection value Vs is equal to or greater than the detection value threshold Vth even after the provisional operation. The airconditioning system 100 is also configured to determine that a refrigerant leakage has occurred if the sensor detection value is high when the fan 320 is in operation, without performing the provisional operation of the fan 320. Thereby, it is possible to detect a refrigerant leakage in the utilization-side unit 300 while avoiding both false detections and detection omissions as much as possible. Any porous material for adsorbing non-target substances as proposed by EP 3 396 261 A1 is not required. Thus, the above technical effect can be achieved without deteriorating air-conditioning performance of the air-conditioning system 100.

The air-conditioning system 100 is further configured to take the predetermined action for outputting alarm information and/or limiting supply of refrigerant to the HEX 330 when a refrigerant leakage is determined to have occurred. Hence, it is possible to improve usability and high safety of the air-conditioning system 100.

<Modifications>

The controller 500 or the unit control section 530 may be disposed outside a housing of the utilization-side unit 300. For instance, the controller 500 or the unit control section 530 may be disposed in the system controller 290 of the heatsource-side unit 200. The information output device 360 may also be disposed outside the housing of the utilization-side unit 300. For instance, the information output device 360 may be a mobile device such as a smart phone or a remote controller which transmits operation signals etc. to the air-conditioner.

The utilization-side unit 300 may further include an information acquisition section configured to acquire detection environment information relating to an environment surrounding the semi-conductor gas sensor 350. The detection environment information may include the operation speed of the fan 320, a detection value outputted from a humidity sensor disposed in the air channel 310, or the like. In this case, the first determination section 551 may be further configured to change value of the first threshold based on the acquired detection environment information. The correlations between the possible contents of the detection environment information and the values to be set as the first threshold may be optimized based on experiments in advance.

The air-conditioning system 100 may be configured to only either one of the cooling operation and the heating operation among these operations. A plurality of the utilization-side units 300 may be connected to a single or a plurality of the heatsourceside units 200. A plurality of utilization-side units 300 may be connected to a common heatsource-side unit 200 by branched liquid refrigerant pipes 283 and second gas refrigerant pipes 284 each having the liquid-side shut-off valve 250 or the gas-side shutoff valve 260. In this case, it is preferable that the predetermined action taken by the detection result utilization section 553 includes outputting a signal for closing the corresponding liquid-side shut-off valve 250 and gas-side shut-off valve 260. Thereby, it is possible to limit supply of refrigerant to only the utilization-side unit 300 in which a refrigerant leakage has occurred, avoiding affecting operations of the other utilizationside units 300.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Thus, the foregoing descriptions of the embodiments according to the present invention are provided for illustration only.

REFERENCE SIGNS LIST

100: Air-Conditioning System
200: Heatsource-Side Unit
210: Refrigerant Compressor
220: Mode Switching Mechanism
230: Heat-Source Side HEX
240: Heatsource-Side Expansion Mechanism
250: Liquid-Side Shut-Off Valve
260: Gas-Side Shut-Off Valve
270: Accumulator
281: High-Pressure Refrigerant Pipe
282: First Gas Refrigerant Pipe
283: Liquid Refrigerant Pipe
284: Second Gas Refrigerant Pipe
285: Low-Pressure Refrigerant Pipe
290: System Controller
300: Utilization-Side Unit
310: Air Channel
311: Air Inlet
312: Air Outlet
320: Fan
330: HEX
340: Expansion Mechanism
350: Semi-Conductor Gas Sensor
360: Information Output Device
400: Target Space
401: Chemical Substances
410: Air Blower
500: Controller
510: Storage Section
520: Detection Value Acquisition Section
530: Unit Control Section
540: Information Output Section
550: Leakage Detection Section
551: First Determination Section
552: Second Determination Section
553: Detection Result Utilization Section

The invention claimed is:

1. An air-conditioner comprising:
an air channel;
a fan configured to cause an airflow passing through the air channel;
a heat exchanger disposed in the air channel to cause a heat-exchange between refrigerant flowing therein and air passing therethrough;
refrigerant pipes for supplying refrigerant to the heat exchanger and discharging the refrigerant from the heat exchanger;
a semi-conductor gas sensor disposed in the air channel and reactive to at least predetermined refrigerant to output a detection value indicating a level of intensity of reaction of the semi-conductor gas sensor; and
a processor configured to perform
a fan operation determination to determine whether the fan is in operation;
a first determination to determine that a refrigerant leakage has occurred on condition that the detection value is equal to or greater than a first threshold when the fan is determined to be in operation;
a second determination to, if the detection value is equal to or greater than a second threshold when the fan is determined not to be in operation, start operation of the fan as a provisional operation, stop the provisional operation of the fan, and determine that a refrigerant leakage has occurred on condition that the detection value is equal to or greater than a third threshold after stopping the provisional operation of the fan, the second threshold being the same as or different from the first threshold, the third threshold being the same as or different from each of the first threshold and the second threshold; and
detection result utilization to take a predetermined action for outputting at least one of alarm information or limiting supply of refrigerant to the heat exchanger when a refrigerant leakage is determined to have occurred by any one of the first and second determinations.

2. The air-conditioner according to claim 1, further comprising:
an expansion valve disposed in one of the refrigerant pipes,
wherein the expansion valve and at least parts of the refrigerant pipes that are connected with the heat exchanger are disposed in the air channel.

3. The air-conditioner according to claim 1, wherein
the heat exchanger and the refrigerant pipes form part of a heat-pump circuit including a refrigerant compressor, and
the predetermined action includes outputting a signal for stopping an operation of the refrigerant compressor.

4. The air-conditioner according to claim 1, wherein
the refrigerant pipes are part of a liquid refrigerant pipe and a gas refrigerant pipe in which a liquid-side shut-off valve and a gas-side shut-off valve are disposed, respectively, and
the predetermined action includes outputting a signal for closing the liquid-side shut-off valve and the gas-side shut-off valve.

5. The air-conditioner according to claim 1, wherein
the heat exchanger and the refrigerant pipes form part of a heat-pump circuit including a refrigerant compressor, and
the predetermined action includes outputting a signal for performing steps of closing a liquid-side shut-off valve, operating the refrigerant compressor until a predetermined condition is satisfied, and closing a gas-side shut-off valve in this order.

6. The air-conditioner according to claim 1, wherein
the predetermined action includes, when the air channel is in communication with a space installed with an air blower which is configured to discharge an air in the space, outputting a signal for starting operation of the air blower.

7. The air-conditioner according to claim 1, wherein
the semi-conductor gas sensor is disposed on a downstream side of the airflow with respect to the heat exchanger.

8. The air-conditioner according to claim 1, wherein
the predetermined refrigerant is R32 refrigerant, and
the semi-conductor gas sensor is disposed on an inner bottom surface of the air channel.

9. The air-conditioner according to claim 1, wherein the processor is further configured to:
acquire detection environment information relating to an environment surrounding the semi-conductor gas sensor, and change value of the first threshold based on the acquired detection environment information.

10. The air-conditioner according to claim 1, wherein the second determination stops the provisional operation of the fan when a first time length has elapsed after starting the provisional operation of the fan, repeatedly determines whether the detection value is equal to or greater than the third threshold after stopping the provisional operation of the fan, and determines that a refrigerant leakage has occurred when the detection value has been determined as equal to or greater than the third threshold by the time when a second time length has elapsed after stopping the provisional operation of the fan, the second time length being the same as or different from the first time length.

11. The air-conditioner according to claim 10, wherein the second determination repeats, up to a predetermined number of times, the provisional operation and the determination of whether the detection value is equal to or greater than the third threshold, as long as the detection value has been determined as equal to or greater than the third threshold within the second time length after the latest provisional operation, and determines that a refrigerant leakage has occurred on condition that the detection value has been determined as equal to or greater than the third threshold within the second time length after each of the predetermined number of times of the provisional operations in a row.

12. The air-conditioner according to claim 10, wherein the semi-conductor gas sensor is configured to output the detection value continuously or repeatedly, the first determination compares the detection value with the first threshold continuously or repeatedly during the fan is in operation except when the fan is in the provisional operation, and the second determination compares the detection value with the second threshold continuously or repeatedly during the fan is not in operation except after the provisional operation of the fan, and compares the detection value and the third threshold continuously or repeatedly to determine whether a refrigerant leakage has occurred during the fan is not in operation after the provisional operation of the fan.

13. An air-conditioning system comprising:
a utilization-side unit which is the air-conditioner according to claim 1;
a heatsource-side unit configured to supply at least one of cool heat or hot heat to the utilization-side unit by means of refrigerant; and
a system controller configured to control operation of the heatsource-side unit,
wherein
the system controller is further configured to continue the operation of the heatsource-side unit during the provisional operation of the fan.

14. A method for monitoring an air-conditioner, the air-conditioner comprising an air channel, a fan configured to cause an airflow passing through the air channel, a heat exchanger disposed in the air channel to cause a heat-exchange between refrigerant flowing therein and air passing therethrough, refrigerant pipes for supplying refrigerant to the heat exchanger and discharging the refrigerant from the heat exchanger, and a semi-conductor gas sensor disposed in the air channel and reactive to at least predetermined refrigerant to output a detection value indicating a level of intensity of reaction of the semi-conductor gas sensor, the method comprising:
determining whether the fan is in operation;
determining that a refrigerant leakage has occurred on condition that the detection value is equal to or greater than a first threshold when the fan is determined to be in operation;
starting operation of the fan as a provisional operation if the detection value is equal to or greater than a second threshold when the fan is determined to be not in operation, the second threshold being the same as or different from the first threshold;
stopping the provisional operation of the fan;
determining that a refrigerant, leakage has occurred on condition that the detection value is equal to or greater than a third threshold after stopping the provisional operation of the fan, the third threshold being the same as or different from each of the first threshold and the second threshold; and
taking a predetermined action for outputting at least one of alarm information or limiting supply of refrigerant to the heat exchanger when a refrigerant leakage is determined to have occurred.

15. The air-conditioner according to claim 2, wherein the heat exchanger and the refrigerant pipes form part of a heat-pump circuit including a refrigerant compressor, and the predetermined action includes outputting a signal for stopping an operation of the refrigerant compressor.

16. The air-conditioner according to claim 2, wherein the refrigerant pipes are part of a liquid refrigerant pipe and a gas refrigerant pipe in which a liquid-side shut-off valve and a gas-side shut-off valve are disposed, respectively, and the predetermined action includes outputting a signal for closing the liquid-side shut-off valve and the gas-side shut-off valve.

17. The air-conditioner according to claim 3, wherein the refrigerant pipes are part of a liquid refrigerant pipe and a gas refrigerant pipe in which a liquid-side shut-off valve and a gas-side shut-off valve are disposed, respectively, and the predetermined action includes outputting a signal for closing the liquid-side shut-off valve and the gas-side shut-off valve.

18. The air-conditioner according to claim 2, wherein the heat exchanger and the refrigerant pipes form part of a heat-pump circuit including a refrigerant compressor, and the predetermined action includes outputting a signal for performing steps of closing a liquid-side shut-off valve, operating the refrigerant compressor until a predetermined condition is satisfied, and closing a gas-side shut-off valve in this order.

19. The air-conditioner according to claim 3, wherein the heat exchanger and the refrigerant pipes form part of a heat-pump circuit including a refrigerant compressor, and the predetermined action includes outputting a signal for performing steps of closing a liquid-side shut-off valve, operating the refrigerant compressor until a predetermined condition is satisfied, and closing a gas-side shut-off valve in this order.

20. The air-conditioner according to claim 4, wherein
the heat exchanger and the refrigerant pipes form part of
a heat-pump circuit including a refrigerant compressor, and the predetermined action includes outputting a signal for performing steps of closing the liquid-side shut-off valve, operating the refrigerant compressor until a predetermined condition is satisfied, and closing the gas-side shut-off valve in this order.

* * * * *